US008275406B2

(12) United States Patent
Chen (10) Patent No.: US 8,275,406 B2
(45) Date of Patent: Sep. 25, 2012

(54) INTEGRATED POWER CONTROL AND LINK ADAPTATION (75) Inventor: Dayong Chen, Cary, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 551 days.

(21) Appl. No.: 12/501,048

(22) Filed: Jul. 10, 2009

(65) Prior Publication Data

US 2010/0279701 A1 Nov. 4, 2010

Related U.S. Application Data (60) Provisional application No. 61/174,039, filed on Apr. 30, 2009.

(51) Int. Cl.
*H04B 7/00* (2006.01)
(52) U.S. Cl. .......... 455/522; 455/67.11; 455/418; 455/450; 455/452.2; 455/453; 455/500; 455/509; 370/328; 370/329; 370/330; 370/337; 370/338; 370/343; 370/345; 370/347
(58) Field of Classification Search ........... 455/452.2, 455/522
See application file for complete search history.

(56) References Cited

U.S. PATENT DOCUMENTS

| 2003/0176184 | A1* | 9/2003 | Hakalin | 455/423 |
|---|---|---|---|---|
| 2004/0141572 | A1* | 7/2004 | Johnson et al. | 375/350 |
| 2005/0136959 | A1* | 6/2005 | Hellwig et al. | 455/522 |
| 2006/0078059 | A1* | 4/2006 | Ok et al. | 375/260 |

OTHER PUBLICATIONS

Huawei Technologies Co et al. "Discussions on SCPIR Selection for alpha-QPSK" 3GPP Draft; GP-090087 Discussions on SCPIR Selection for Alpha-QPSK, 3rd Generation Partnership Project (3GPP), Mobile Competence Centre, 650, Route Des Lucioles, F-06921 Sophia-Antipolis Cedex, France, vol. TSG Geran, No. Malta; 20090216. Feb. 11, 2009.
Rohani B et al: Combined AMR Mode 1-7, Adaptation and Fast Power Control for GSM 16-21,25 Phase 2+. Communications, 2005 Asia-Pacific Conference on Perth, Western Australia Oct. 3-5, 2005, Piscataway, NJ, USA,IEEE LNKD-DOI:10.1109/APCC.2005. 1554091, Oct. 3, 2005, pp. 411-415, XP010860813 ISBN: 978-0-7803-9132-1 section III.

* cited by examiner

*Primary Examiner* — Jean Gelin
*Assistant Examiner* — Amanuel Lebassi (57) ABSTRACT

A method and apparatus in a base station for jointly controlling sub-channel transmission power and assigned codec modes for a first and second mobile station utilizing Voice services over Adaptive Multi-user channel on One Slot (VAMOS). The base station receives signal quality information reports from the mobile stations every 480 ms using the Slow Associated Control Channel (SACCH), and receives codec mode requests from the mobile stations every 40 ms using Adaptive Multi-Rate (AMR) in-band signaling. The base station associates the requested codec modes with estimated levels of speech quality currently being experienced by the first and second mobile stations. The base station then allocates sub-channel transmission power and assigns codec modes to the first and second mobile stations based on the estimated levels of speech quality associated with the requested codec modes and the signal quality reports.

10 Claims, 5 Drawing Sheets

INTEGRATED POWER CONTROL AND LINK ADAPTATION

CROSS-REFERENCE TO RELATED APPLICATIONS

This application claims the benefit of U.S. Provisional Application No. 61/174,039 filed Apr. 30, 2009 and entitled, "Integrated VAMOS Power Control and AMR Link Adaptation," the contents of which are incorporated by reference herein.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to radio telecommunication systems. More particularly, and not by way of limitation, the present invention is directed to an apparatus and method for improving speech quality in a radio telecommunication system.

The Global System for Mobile Communications (GSM) network is expanding rapidly due to the increased demand for mobile voice service in emerging markets with densely populated cities and limited radio spectrum. To achieve this, the existing spectrum for circuit-switched voice channels must carry additional voice traffic. It is of great interest to operators to carry this increased voice traffic while maintaining acceptable voice quality.

To increase voice capacity, a new GSM feature called Voice services over Adaptive Multi-user channel on One Slot (VAMOS) is currently being standardized in the GSM EDGE Radio Access Network (GERAN) to multiplex two mobile terminals in speech mode onto the same traffic channel (TCH) using the same time slot and carrier frequency. Traditionally, the speech signals of different users are transmitted in different time slots. The speech payload bits are channel encoded, mapped to bursts, modulated using GMSK, rotated by $\pi/2$, filtered with a transmission (TX) pulse, and transmitted. VAMOS, however, combines two burst-mapped encoded speech data streams by using an adaptive quaternary constellation. To generate one such symbol, one bit from the first stream is mapped to the Most Significant Bit (MSB) and one bit from the second signal is mapped to the Least Significant Bit (LSB). These so-called "dibits" are mapped to a symbol of the constellation. This procedure is repeated until all bits of the two streams have been used. The resulting symbols are progressively rotated by $\pi/2$, filtered with the TX pulse, and then transmitted.

Each of the two co-TCH mobile stations extracts its own signal using its training sequence. The training sequences of the two mobile stations must exhibit low cross-correlation and good auto-correlation, and are preferably orthogonal. Since the signal of one user interferes with the signal of the other user, interference cancellation capability of the mobile receivers is highly desirable. It is advantageous that at least one of the two users has the Single Antenna Interference Cancellation (SAIC) capability. With SAIC, a mobile station requires a lower carrier-to-interference (C/I) ratio for correctly decoding received signals. This enables the base station to allocate additional power to the other mobile station which may need more power in order to stay on channel.

The sub-channel transmission power allocated to the two co-TCH users must be carefully controlled, especially on the downlink. However, the mobiles cannot send up-to-date downlink quality information to the base station because there is no fast control channel in the GSM system. It has been proposed to use RXQUAL to control the Sub-Channel Power Imbalance Ratio (SCPIR). RXQUAL is a signal quality level that is determined from the average Bit Error Rate (BER) calculated every 480 ms. The mobile stations send RXQUAL to the base station every 480 ms as part of their measurement reports.

BRIEF SUMMARY OF THE INVENTION

A challenge regarding efficient VAMOS operation is to rapidly and accurately control the sub-channel transmission power allocated to the two co-TCH users, especially on the downlink due to the rapidly changing channel conditions of the two co-TCH users and due to the lack of up-to-date downlink quality information of the two users. Existing methodologies for sub-channel transmission power control attempt to separately control sub-channel transmission power and codec mode adaptation. However, none of these methodologies are fast enough to adapt to the different and rapidly varying radio conditions of the two co-TCH users. The rate at which the mobile stations send RXQUAL measurement reports to the base station (every 480 ms) is too slow for accurate sub-channel specific power control due to the lack of accurate and up-to-date downlink quality information at the base station. Additionally, the base station cannot determine the current speech quality based on the RXQUAL because the same RXQUAL level can correspond to very different Frame Erasure Rates (FER), which ultimately determines the speech quality. All other downlink quality measures such as Bit Error Probability (BEP) have the same problems as RXQUAL.

An embodiment of the present invention achieves accurate and timely sub-channel transmission power control through the integration of sub-channel power control and Adaptive Multi-Rate (AMR) link adaptation for the co-TCH users. The invention jointly controls the codec modes and received signal power levels of the two co-TCH users to maximize the speech quality of the two users within the given total transmit power.

The present invention, as described in exemplary embodiments below, provides increased accuracy of VAMOS sub-channel power control by utilizing AMR codec mode requests that are sent much more frequently by the mobile stations through the bandwidth efficient AMR in-band signaling channel. The base station is able to more frequently apply the requested codec modes, estimate speech quality at the co-TCH mobile stations, and adjust the power allocation between the mobile stations. This provides increased voice capacity, improved voice quality, and more efficient use of the allocated transmission power. By utilizing existing AMR in-band signaling for VAMOS sub-channel power control without introducing new signaling channels, the invention reduces the implementation costs and shortens the deployment time for VAMOS. No changes are needed in the existing mobile stations to support the joint power and AMR control of the present invention.

Thus, in one embodiment, the present invention is directed to a method in a base station for jointly controlling sub-channel transmission power and assigned codec modes for a first mobile station and a second mobile station sharing the same frequency and time slot in a radio telecommunication system. The method includes the steps of receiving a codec mode request from the first mobile station and a codec mode request from the second mobile station, each request requesting a codec mode for channel coding future downlink transmissions; associating the requested codec modes with estimated levels of speech quality currently being experienced by the first and second mobile stations; and allocating sub-channel transmission power and assigning codec modes to the first and second mobile stations based on the estimated levels of speech quality associated with the requested codec modes.

In another embodiment, the method includes the steps of allocating initial portions of the sub-channel transmission power to the first and second mobile stations and assigning initial codec modes to the first and second mobile stations; transmitting speech frames to the first and second mobile stations; receiving measured speech quality indications from the first mobile station and the second mobile station; and determining by the base station, new codec modes and a new allocation of sub-channel transmission power for the first and second mobile stations based on the measured speech quality indications. The method also includes subsequently receiving codec mode requests from the first and second mobile stations; and upon receiving the codec mode requests, determining updated speech quality estimates for the first and second mobile stations based on each mobile station's requested codec mode. The base station then determines whether the updated speech quality estimates are acceptable and balanced at the first and second mobile stations. Upon determining that the updated speech quality estimates are acceptable and balanced, the base station applies the requested codec modes to a next speech frame while maintaining the initial allocation of transmitter power. Upon determining that the updated speech quality estimates are not acceptable at one of the mobile stations or are not balanced, the base station applies the requested codec modes to the next transmission and shifts the transmitter power allocation from the mobile station with better speech quality to the mobile station with poorer speech quality.

In another embodiment, the present invention is directed to an apparatus in a base station for jointly controlling sub-channel transmission power and assigned codec modes for a first mobile station and a second mobile station sharing the same frequency and time slot in a radio telecommunication system. The apparatus includes a receiver for receiving a codec mode request from the first mobile station and a codec mode request from the second mobile station, each request requesting a codec mode for channel coding future downlink transmissions; means for associating the requested codec modes with estimated levels of speech quality currently being experienced by the first and second mobile stations; and means for allocating sub-channel transmission power and assigning codec modes to the first and second mobile stations based on the estimated levels of speech quality associated with the requested codec modes.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Due to the different and varying radio conditions of the two co-TCH users (i.e. path losses, fading and interference levels) in VAMOS operation, it is critical for the base station to control the Sub-Channel Power Imbalance Ratio (SCPIR) accurately to maintain the voice quality of the two users. SCPIR is defined as:

$$SCPIR = 10 \log_{10}(P1/P2)$$

where P1 and P2 are the allocated powers to the two users and P1+P2=P where P is the total transmit power allocated to the two co-TCH users.

Several alternative downlink modulation techniques have been proposed for VAMOS in 3GPP TR 45.914, "Circuit Switched Voice Capacity Evolution for GSM/EDGE Radio Access Network," v.1.0.2 (2009.01), including Orthogonal Sub-Channel (OSC) and α-QPSK. With OSC, the SCPIR can be changed by choosing different subsets of the existing 8PSK constellation used for EDGE. With α-QPSK, the SCPIR can be continuously changed by adjusting the α value. The modulation symbols are related to α as follows:

$$\alpha\sqrt{\frac{1}{2}} + j\sqrt{2-\alpha^2}\sqrt{\frac{1}{2}}, \quad \alpha\sqrt{\frac{1}{2}} - j\sqrt{2-\alpha^2}\sqrt{\frac{1}{2}},$$
$$-\alpha\sqrt{\frac{1}{2}} + j\sqrt{2-\alpha^2}\sqrt{\frac{1}{2}}, \quad -\alpha\sqrt{\frac{1}{2}} - j\sqrt{2-\alpha^2}\sqrt{\frac{1}{2}}$$

The relationship between SCPIR and α is:

$$\chi = 10\log_{10}\left(\frac{\alpha^2}{2-\alpha^2}\right)$$

It should be noted that this disclosure uses α-QPSK modulation for illustration purposes, but the proposed methods are also applicable to OSC and any other VAMOS modulation schemes.

As noted above, an embodiment of the present invention accurately controls the transmission powers allocated to two co-TCH users by integrating sub-channel power control and AMR link adaptation. AMR addresses problems experienced in GSM transmission in which speech signals are transmitted using a fixed-rate speech codec, including GSM Full-Rate (FR), Enhanced FR (EFR), and Half-Rate (HR) speech codecs. The FR codec delivers a fixed source bit rate of 13 kbps to the channel encoder which adds a fixed amount of redundancy to the source information for error protection. The channel encoder output with a gross bit rate of 22.8 kbps is transmitted over the radio interface. However, fixed rate codecs are inefficient. Fixed channel coding redundancy is wasteful in very good channel conditions, and not robust in very bad channel conditions.

AMR codecs overcome this problem by adapting the source and the channel coding rate to the varying channel conditions. AMR provides multiple codec modes, and each mode has a different source/channel coding rate. In this disclosure, the GSM Adaptive Full-rate Speech (AFS) codecs are used for illustration purposes, but the proposed methods are also applicable for other classes of AMR codecs, including Adaptive Half-rate Speech codecs (AHS), Wideband Full-rate Speech codecs (WFS), and Wideband Half-rate Speech codecs (WHS).

The GSM AFS codec includes eight modes, numbered from 0 to 7. The AFS4.75 mode has the lowest source rate (i.e., 4.75 kbps) and the lowest intrinsic speech quality, but provides the most robust coding. The AFS12.2 mode has the highest source rate (i.e., 12.2 kbps), but the least robust coding. AFS12.2 has the best intrinsic voice quality due to the higher source rate, but only in good radio conditions. In very bad conditions, AFS4.75 has the best voice quality due to the strong coding.

Figure 3:
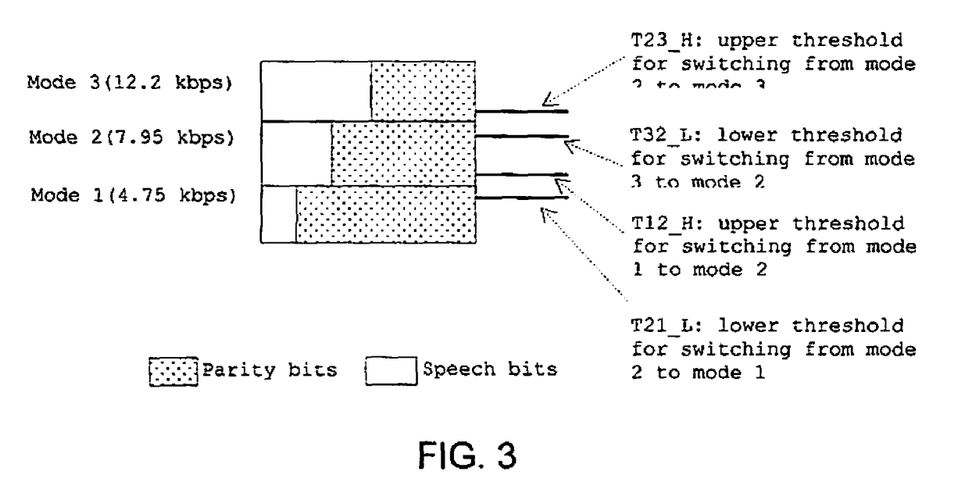
FIG. 3 is an illustrative drawing showing an exemplary Active Code Set (ACS) and associated C/I thresholds for codec mode switching according to the teachings of the present invention.

For AMR downlink adaptation, a mobile station selects a codec mode which is the best for the current radio condition and sends a codec mode request to the base station every 40 ms. The mobile stations estimate the C/I of every received burst, filter the C/I, and compare the filtered C/I with a set of thresholds to select the codec mode. The thresholds can be pre-defined or adaptive to the current radio conditions. Example thresholds are shown in FIG. 3 below. The base station can either grant or override the mode request. The base station sends the mobile station a mode command and mode indication, indicating which mode is actually applied. The signaling of the mode request and indication must be fast. However, there is no sufficiently fast signaling channel in GSM. Therefore, the mode request and indication are signaled in-band, i.e., together with the speech payload.

To reduce the bandwidth used by the in-band signaling, one uplink frame (20 ms) contains the codec mode request, requesting a codec mode for future frames, and the next uplink frame (20 ms) contains a mode indication indicating the codec mode used for the current frame. Similarly, one downlink frame contains the mode command by the base station and the next downlink frame contains the mode indication. Both the mobile station and the base station know whether a received frame contains mode request or indication. The mode request and indication are channel encoded separately from the speech payload. Prior to decoding a speech frame containing a mode indication, the receiver must first decode the mode indication, before decoding the speech payload.

Three bits are needed to signal which of the eight AFS codec modes is requested or applied. To minimize the signaling overhead, a pre-defined Active Code Set (ACS) containing up to four different codec modes is utilized. The mobile station can only switch between the modes in the ACS. The use of the ACS reduces the number of signaling bits from three bits to two bits, without including the parity bits to protect the signaling bits.

The mobile station selects the best codec mode by estimating the C/I at the input of the equalizer and comparing the C/I estimate with a set of pre-defined thresholds. Two thresholds, an upper and a lower threshold, are used for switching between two adjacent modes. If the C/I estimate exceeds the upper threshold, the less robust mode is selected. If the C/I estimates is below the lower threshold, the more robust mode is selected.

The sub-channel power control must be accurate and fast to adapt to the rapidly varying channel conditions of the two co-TCH users. Otherwise, one user may have bad voice quality while the other user has an unnecessarily high C/I. An existing proposed solution is for the base station to perform sub-channel power control based on a received quality (RXQUAL) indication included in the measurement report from the mobile station. However, there are several problems with this approach. First, the mobile station sends the measurement report every 480 ms, which is too slow for sub-channel power control. Second, the RXQUAL, which is the average raw Bit Error Rate (BER) estimate over the past measurement period, is quantized to only eight levels, which is too few. Third, two co-TCH users with very different voice qualities can report the same RXQUAL value, if one user experiences fast fading while the other user experiences slow fading. Other downlink quality measures included in the Measurement Report or Enhanced Measurement Report (EMR) such as Bit Error Probability (BEP) also suffer from the same problems.

The present invention overcomes these problems by utilizing AMR mode requests for downlink sub-channel power control. The AMR mode requests are sent to the base station much more frequently than RXQUAL, i.e., every 40 ms instead of every 480 ms. Additionally, the AMR mode requests are more closely related to the current voice quality than the RXQUAL. By utilizing the existing AMR in-band signaling mechanism, there is no need to introduce a new control channel and there is no additional signaling overhead. In addition, the invention performs the sub-channel power control and AMR link adaptation jointly for the co-TCH users since the optimum SCPIR and codec modes for co-TCH users are closely related.

Figure 1:
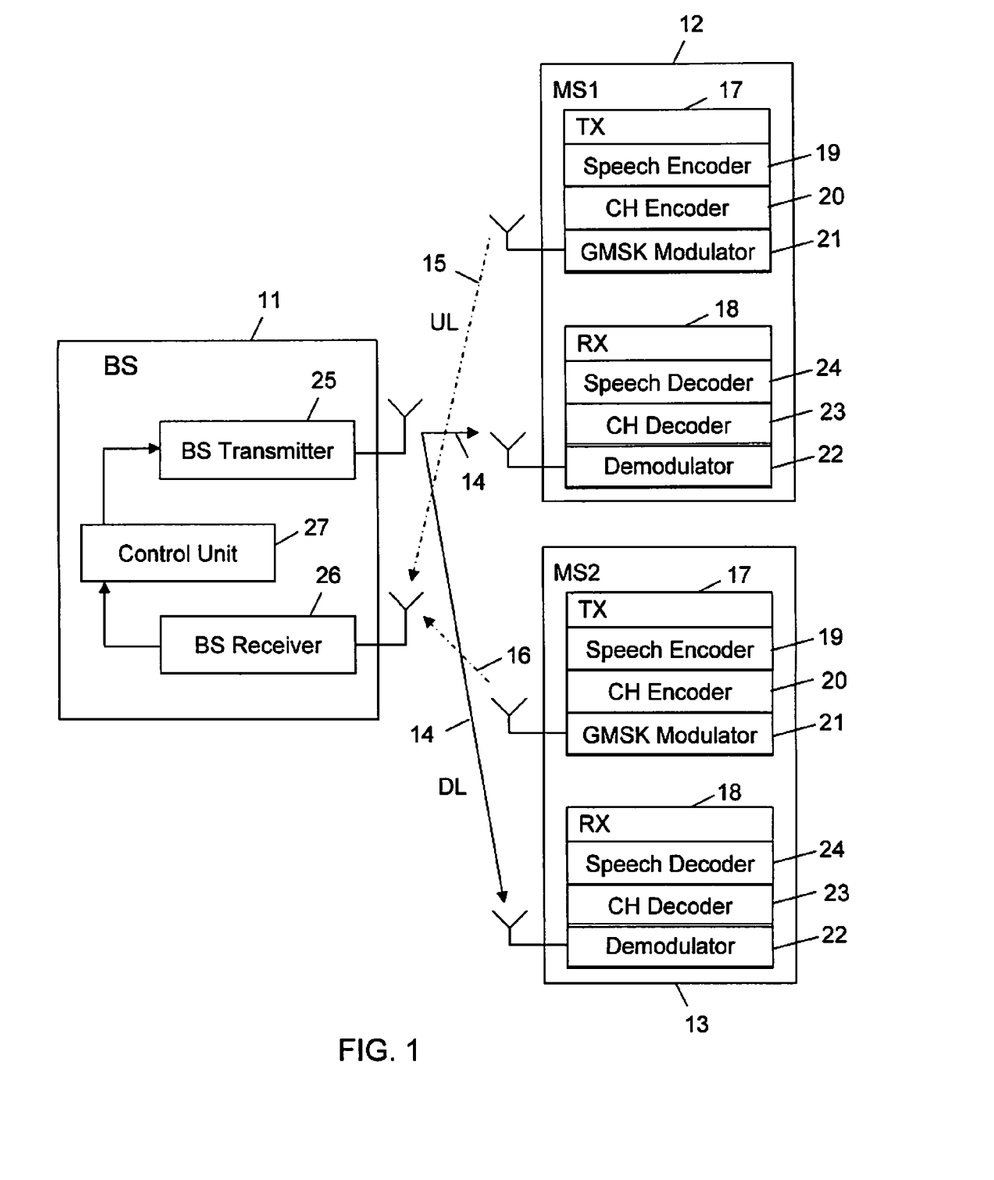
FIG. 1 is a simplified block diagram of a Voice services over Adaptive Multi-user channel on One Slot (VAMOS) system.

FIG. 1 is a simplified block diagram of a VAMOS system 10. A base station (BS) 11 communicates with two co-TCH users MS1 12 and MS2 13, utilizing AMR. On the downlink, the base station transmits a VAMOS signal 14 to the two co-TCH users. On the uplink, the base station receives two signals 15, 16 in the same time slot. Each of the mobile stations includes a transmitter 17 and a receiver 18. The transmitter includes a speech encoder 19, a channel encoder 20, and a GMSK modulator 21. The receiver includes a demodulator 22, a channel decoder 23, and a speech decoder 24. The base station includes a transmitter 25, a receiver 26, and a control unit 27. At least one of the mobile stations has SAIC capability. The base station transmitter likewise includes a speech encoder, a channel encoder, and a modulator. The base station receiver includes a demodulator, channel decoder, and a speech decoder. For simplicity, the components of the base station transmitter and receiver are not shown.

Figure 2:
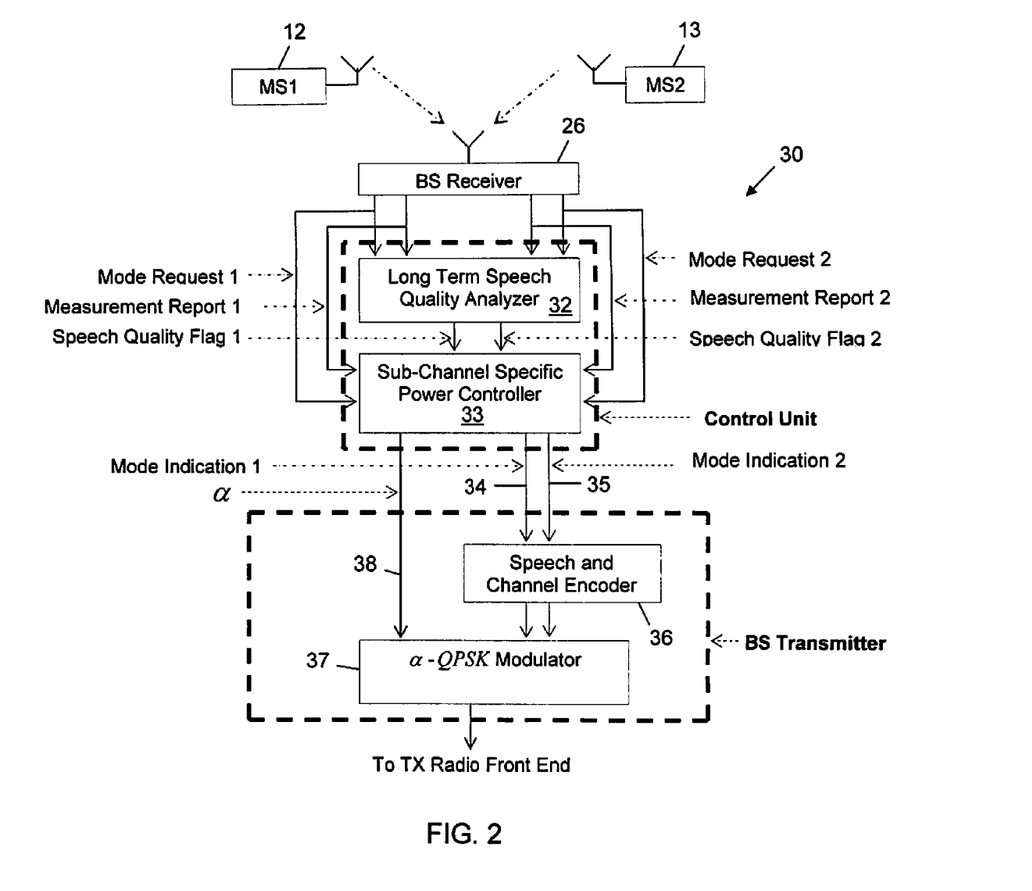
FIG. 2 is a simplified block diagram of an exemplary embodiment of a base station modified according to the teachings of the present invention.

FIG. 2 is a simplified block diagram of an exemplary embodiment of a base station 30 of the present invention in which sub-channel power control and AMR link adaptation are integrated. MS1 12 and MS2 13 are existing mobile stations that support AMR and SAIC. No further modifications to the mobile stations are required when implementing the present invention. MS1 and MS2 each transmit a speech frame every 20 ms on the same time slot. Each frame includes an in-band mode request or mode indication. Each mobile station also transmits a RXQUAL Measurement Report or Enhanced Measurement Report every 480 ms, using the Slow Associated Control Channel (SACCH). The base station receiver 26 receives the messages from the mobile stations. After demodulation and channel decoding, the base station receiver forwards the mode requests and Measurement Reports to a Control Unit 31 which includes a Long Term Speech Quality Analyzer 32 and a Sub-channel Specific Power Controller 33.

An appropriate Active Codec Set (ACS) is selected for VAMOS operation. The ACS should include at least one high rate mode, one medium rate mode, and a low rate mode. The high rate mode may be utilized to maximize the speech quality whenever both co-TCH users have good channel conditions. The low rate mode is robust against external interference and/or the mutual interference caused by the two co-TCH users and therefore may be utilized when one of the users is experiencing poor channel conditions. The medium rate mode may be utilized to balance the speech quality of the two users when channel conditions are acceptable to each user. Alternatively, the ACS can also include additional codec modes for finer granularity of control although the maximum number of codec modes is current set at four.

During a call, the Speech Quality Analyzer 32 continuously estimates the speech quality of each mobile station and for each codec mode. Based on the Measurement Report received at the previous 480 ms reporting time and the most recent codec mode requests, the Speech Quality Analyzer updates the estimated speech quality by inferring changes in speech quality based on the codec mode requested by each co-TCH mobile station. For example, if a lower, more robust codec mode is requested, the Speech Quality Analyzer infers that the speech quality has degraded. Conversely, if a higher, less robust codec mode is requested, the Speech Quality Analyzer infers that the speech quality has improved. The Speech Quality Analyzer compares the updated speech quality estimate against a quality limit. A speech quality flag is raised if the speech quality exceeds the limit.

Every 40 ms, the base station receives two in-band mode requests, one from each co-TCH mobile station. One of the mobile stations will request a more robust mode if the mobile station's C/I decreases below one or more threshold levels, as described further in connection with FIGS. 3 and 4. Likewise, the mobile station requests a less robust codec mode if the mobile station's C/I increases above one or more threshold levels. Based on the mode requests, the Sub-channel Specific Power Controller 33 may change the transmit power allocation between the two co-TCH users, thus changing the SCPIR, to balance the speech quality of the two users.

After determining the codec mode and the transmit power allocation for each co-TCH user, the Sub-channel Specific Power Controller 33 passes a mode indication 34 for MS1 and a mode indication 35 for MS2 to a Speech Encoder and Channel Encoder 36. The Speech Encoder and Channel Encoder, in turn, passes the speech and channel encoded data to an α-QPSK modulator 37. In addition, the Sub-channel Specific Power Controller converts the calculated SCPIR to a corresponding α value 38 and passes it to the α-QPSK modulator. The modulated data is then sent to the transmitter radio front end for transmission to MS1 and MS2.

The following example illustrates the control process. In this example, MS1 and MS2 both use an ACS that has three codec modes: Mode1 (4.75 kbps), Mode2 (7.95 kbps), and Mode3 (12.2 kbps).

FIG. 3 is an illustrative drawing showing the three codec modes of the ACS and associated C/I thresholds for codec mode switching. There are two thresholds, an upper and lower threshold, between each two adjacent modes. The mobile station requests a change from a lower rate mode to a higher rate mode if the C/I is above the upper threshold. A request to change from the higher rate to lower rate mode is sent if the C/I is below the lower threshold. The buffer zone between the lower and upper threshold is used to reduce the ping-pong effect.

As an example, if a mobile station's measured C/I falls below the threshold T21_L, the mobile station requests Mode1, the most robust 4.75 kbps mode. If the measured C/I rises above T12_H, the mobile station requests Mode2, the medium 7.95 kbps mode. If the measured C/I is above the threshold T23_H, the mobile station requests Mode3, the 12.2 kbps mode. If the measured C/I subsequently falls below T23_L, but is above T21_L, then the mobile station requests Mode2, the 7.95 kbps mode.

Figure 4:
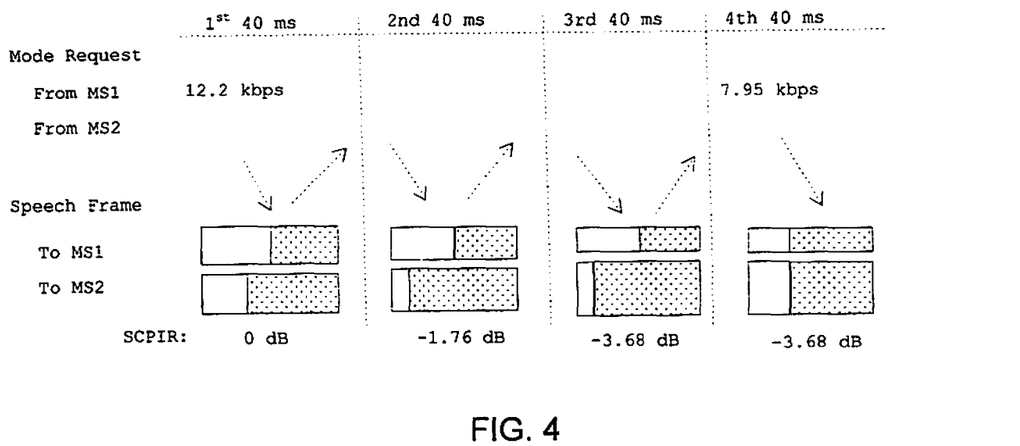
FIG. 4 is a timing diagram illustrating dynamic sub-channel power control based on the AMR mode request according to the teachings of the present invention.

FIG. 4 is a timing diagram illustrating dynamic sub-channel power control based on the AMR mode request in an exemplary embodiment of the method of the present invention. In this exemplary scenario, each mobile station is initially allocated 50 percent of the total power (P) which corresponds to 0 dB SCPIR. In the first 40 ms period, MS1 sends a codec mode request requesting 12.2 kbps and MS2 sends a codec mode request requesting 7.95 kbps. The base station determines that the speech quality of both users is acceptable because neither of the mobile stations requested the 4.75 kbps mode. Therefore, the base station applies the requested modes and does not change the current SCPIR.

In the second 40 ms period, MS1 still requests 12.2 kbps whereas MS2 sends a codec mode request requesting 4.75 kbps because the C/I for MS2 has dropped below T21_L due to, for example, shadowing. To balance the speech quality, the base station allocates 40 percent of the total power (0.4 P) to MS1 and 60 percent of total power (0.6 P) to MS2. The corresponding SCPIR is equal to −1.76 dB. The Sub-channel Specific Power Controller 33 converts the SCPIR value to the corresponding α value and passes it to the α-QPSK modulator.

In the third 40 ms period, MS1 and MS2 still request the 12.2 kbps and 4.75 kbps, respectively, since in this scenario, the decreased signal power at MS1 did not cause the C/I at MS1 to drop below T32_L, and the increased signal power at MS2 did not cause the C/I at MS2 to increase above T12_H. The requested modes indicate to the base station that MS1 still enjoys better voice quality than MS2. In response, the base station makes a further change to the power allocation and allocates only 30 percent of the total power (0.3 P) to MS1 and 70 percent of the total power (0.7 P) to MS2. This corresponds to −3.68 dB SCPIR. The Sub-channel Specific Power Controller 33 converts the SCPIR value to the corresponding α value and passes it to the α-QPSK modulator.

Due to the new power imbalance ratio, it is assumed in this scenario that the C/I at MS1 now drops below the T32_L threshold, and the C/I at MS2 increases above the T12_H threshold in the fourth 40 ms period. Consequently, MS1 requests the 7.95 kbps mode, and MS2 requests the 7.95 kbps mode. The speech quality of the both users is now balanced. The base station applies the requested modes to the two users, but does not change the current power allocation, i.e., the SCPIR remains −3.68 dB.

It is possible that both MS1 and MS2 may request the 4.95 kbps mode, indicating that both of the mobile stations are experiencing poor speech quality (a case not shown in FIG. 4). If that happens, the base station may either increase the total power allocated to the two co-TCH users, or may cease VAMOS operation and assign one of the users to a separate time slot in order to improve the voice quality for the two users.

The above example shows only one way of using the AMR in-band signaling for sub-channel specific power control. Other control strategies are also possible. The following are some examples.

The change of SCPIR can be based on both the codec mode requests and the RXQUAL of the two mobile stations.

In each control cycle of 40 ms, the individual power level of the two mobile stations can be varied depending on their codec mode request and RXQUAL and other quality measures in the last received quality reports.

The base station can override the codec mode request of one or both mobile stations. For example, since MS1 receives less power in the 3rd 40 ms, the base station can force MS1 to use mode 2 which is more robust to compensate for the reduced signal power.

Figure 5:
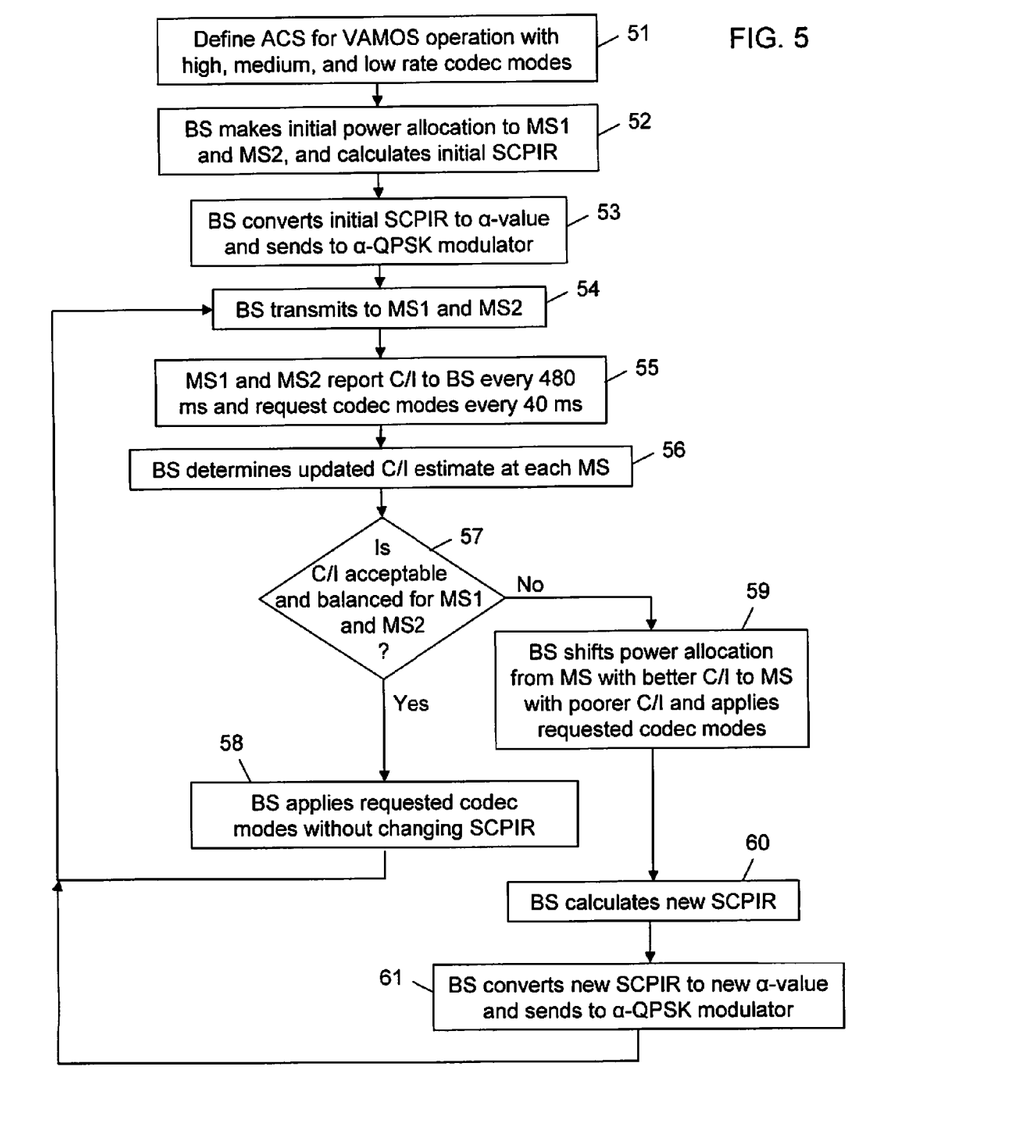
FIG. 5 is a flow chart illustrating the steps of an exemplary embodiment of the method of the present invention.

FIG. 5 is a flow chart illustrating the steps of an exemplary embodiment of the method of the present invention. At step 51, an ACS is defined for VAMOS operation, preferably with three or four codec modes including a high, medium, and low rate mode. At step 52, the base station makes an initial power allocation to the two co-TCH mobile stations, MS1 and MS2, and calculates an initial SCPIR. At step 53, the Sub-channel Specific Power Controller 33 in the base station converts the SCPIR value to the corresponding $\alpha$ value and passes it to the $\alpha$-QPSK modulator 37. At step 54, the base station transmits different speech frames to MS1 and MS2 on the same carrier frequency and time slot utilizing VAMOS operation. At step 55, MS1 and MS2 report their speech quality or C/I in an RXQUAL Measurement Report every 480 ms, while sending codec mode requests to the base station every 40 ms utilizing AMR in-band signaling.

At step 56, the base station determines an updated estimate of the C/I at each mobile station based on the received codec mode requests. At step 57, the base station determines whether the updated C/I estimate is acceptable and balanced (i.e., approximately equal) for both MS1 and MS2. If so, the base station applies the requested codec modes without changing the power allocation between the two mobile stations (i.e., without changing the SCPIR). The method then returns to step 54 where the base station transmits the next speech frames to MS1 and MS2.

However, if the base station determines that the updated C/I estimate for one of the mobile stations is not acceptable because the mobile station has requested the low rate 4.75 kbps codec mode and/or the RXQUAL indicates bad radio condition, the method moves to step 59 where the base station shifts a portion of the allocated power from the mobile station with a good C/I estimate to the mobile station with the poor C/I estimate, and applies the requested codec modes. The size of the shifted portion of allocated power is selected to balance reaction time and over-shooting. At step 60, the base station calculates a new SCPIR based on the new power allocation, and at step 61, the Sub-channel Specific Power Controller 33 in the base station converts the SCPIR value to the corresponding $\alpha$ value and passes it to the $\alpha$-QPSK modulator 37. The method then returns to step 54 where the base station transmits the next speech frames to MS1 and MS2.

The present invention, as described in exemplary embodiments above, provides increased accuracy of VAMOS sub-channel power control due to the use of mode requests that are sent more frequently by the mobile stations. This translates into increased voice capacity, improved voice quality, and more efficient allocation of transmission power. The invention utilizes existing AMR in-band signaling for VAMOS sub-channel power control without introducing new signaling channels. This reduces the implementation costs and shortens the deployment time for VAMOS. No changes are needed in the existing mobile stations to support the joint power and AMR control.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a base station for jointly controlling sub-channel transmission power and assigned codec modes for a first mobile station and a second mobile station sharing the same frequency and time slot in a radio telecommunication system, said method comprising the steps of:
   allocating initial portions of the sub-channel transmission power to the first and second mobile stations and assigning initial codec modes to the first and second mobile station;
   transmitting speech frames to the first and second mobile station;
   receiving measured speech quality indications from the first mobile station and the second mobile station;
   determining by the base station, new codec modes and a new allocation of sub-channel transmission power for the first and second mobile station based on the measured speech quality indications;
   subsequently receiving codec mode requests from the first and second mobile stations;
   upon receiving the codec mode requests from the first and second mobile stations, determining updated speech quality estimates for the first and second mobile stations based each mobile station's requested codec mode;
   determining by the base station, whether the updated speech quality estimates are acceptable and balanced at the first and second mobile stations;
   upon determining that the updated speech quality estimates are acceptable and balanced, applying by the base station, the requested codec modes to a next speech frame while maintaining the initial allocation of transmitter power; and
   upon determining that the updated speech quality estimates are not acceptable at one of the mobile stations or are not balanced, applying by the base station, the requested codec modes to the next transmission and shifting the transmitter power allocation from the mobile station with better speech quality to the mobile station with poorer speech quality.

2. The method according to claim 1, wherein measured speech quality indications are received from the first and second mobile stations at a first periodic rate, while codec mode requests are received from the first and second mobile stations at a second periodic rate which is faster than the first periodic rate.

3. The method according to claim 2, wherein the first periodic rate is once every 480 ms, and the second periodic rate is once every 40 ms.

4. The method according to claim 1, further comprising the step of:
   upon determining that the updated speech quality estimates are not acceptable at both of the mobile stations, increasing the total power allocated to the two mobile stations.

5. The method according to claim 1, further comprising the step of:
   upon determining that the updated speech quality estimates are not acceptable at both of the mobile stations, assigning one of the mobile stations to a separate time slot.

6. An apparatus in a base station for jointly controlling sub-channel transmission power and assigned codec modes for a first mobile station and a second mobile station sharing the same frequency and time slot in a radio telecommunication system, said apparatus comprising:
- a control unit configured to allocate initial portions of the sub-channel transmission power to the first and second mobile stations and assign initial codec modes to the first and second mobile station;
- a transmitter configured to transmit speech frames to the first and second mobile station;
- a receiver configured to receive measured speech quality indications from the first mobile station and the second mobile station;
- the control unit is further configured to determine new codec modes and allocation of sub-channel transmission power for the first and second mobile station based on the measured speech quality indications;
- the receiver configured to receive codec mode requests from the first and second mobile stations;
- the control unit configured to and determine updated speech quality estimates for the first and second mobile stations based each mobile station's requested codec mode and determine whether the updated speech quality estimates are acceptable and balanced at the first and second mobile stations, and if so, apply the requested codec modes to a next speech frame while maintaining the initial allocation of transmitter power; and
- the control unit is configured to shift the transmitter power allocation from the mobile station with better speech quality to the mobile station with poorer speech quality if the updated speech quality estimates are not acceptable at one of the mobile stations or are not balanced.

7. The apparatus of claim 6, wherein the receiver and control unit are configured to measure speech quality indications from the first and second mobile stations at a first periodic rate and receive codec mode requests from the first and second mobile stations at a second periodic rate which is faster than the first periodic rate.

8. The apparatus according to claim 7, wherein the first periodic rate is once every 480 ms, and the second periodic rate is once every 40 ms.

9. The apparatus according to claim 6, wherein if the control unit determines the updated speech quality estimates are not acceptable at both of the mobile stations, the transmitter is configured to increase the total power allocated to the two mobile stations.

10. The apparatus according to claim 6, wherein if the control unit determines that the updated speech quality estimates are not acceptable at both of the mobile stations, the means is configured to assign one of the mobile stations to a separate time slot.

* * * * *